(12) United States Patent
Merino Lamela

(10) Patent No.: US 6,220,646 B1
(45) Date of Patent: Apr. 24, 2001

(54) CANVAS ROLLING AND UNROLLING SYSTEM FOR GOODS TRANSPORT VEHICLES

(75) Inventor: Julio Guzman Merino Lamela, La Coruña (ES)

(73) Assignees: Julie Guzman Merino Lamela; Jose Francisco Seone Sanchez, both of al La Coruna (ES)

(*) Notice: Subject to any disclaimer, the term of this patent is extended or adjusted under 35 U.S.C. 154(b) by 0 days.

(21) Appl. No.: 09/214,702

(22) PCT Filed: Feb. 28, 1997

(86) PCT No.: PCT/ES97/00046

§ 371 Date: Sep. 22, 1999

§ 102(e) Date: Sep. 22, 1999

(87) PCT Pub. No.: WO98/01312

PCT Pub. Date: Jan. 15, 1998

(30) Foreign Application Priority Data

Jul. 9, 1996 (ES) .................................................. 9601537
Feb. 27, 1997 (ES) .................................................. 9700434

(51) Int. Cl.[7] ........................................................ B60P 7/02
(52) U.S. Cl. ................. 296/98; 296/100.11; 296/100.12; 296/100.14; 296/100.15; 296/100.16
(58) Field of Search ....................... 296/98, 100, 100.11, 296/100.12, 100.14, 100.16, 100.15

(56) References Cited

U.S. PATENT DOCUMENTS

| | | | |
|---|---|---|---|
| 3,768,540 | * 10/1973 | McSwain | 296/98 |
| 4,991,640 | * 2/1991 | Verkindt et al. | 296/100 |
| 4,991,901 | * 2/1991 | Meekhof, Sr. et al. | 296/98 |
| 5,112,097 | * 5/1992 | Turner, Jr. | 296/100 |
| 5,165,461 | * 11/1992 | Haddad, Jr. | 296/98 |
| 5,179,991 | * 1/1993 | Haddad, Jr. | 296/98 |
| 5,205,605 | * 4/1993 | Haddad, Jr. | 296/98 |
| 5,211,440 | * 5/1993 | Cramaro | 296/98 |
| 5,380,058 | * 1/1995 | Short et al. | 296/98 |
| 5,429,408 | * 7/1995 | Henning et al. | 296/100 |

* cited by examiner

Primary Examiner—D. Glenn Dayoan
Assistant Examiner—Greg Blankenship
(74) Attorney, Agent, or Firm—Jacobson, Price, Holman & Stern, PLLC (57) ABSTRACT

System for rolling and unrolling canvas around the loading area of transport vehicles. Two appropriate motors exert a force sufficient to move a roll whereon is rolled the canvas, the latter slidingly moving by powered guides until they sealingly cover the area where goods to be transported are placed and likewise automatically gather the canvas when discharging the goods.

7 Claims, 9 Drawing Sheets

CANVAS ROLLING AND UNROLLING SYSTEM FOR GOODS TRANSPORT VEHICLES

FIELD OF THE INVENTION

This invention, refers to an automatic system for canvas covering and uncovering in the loading area for freight vehicles, which has been conceived and performed in order to obtain numerous and noteworthy advantages as regards the manual way that is traditionally used to cover vehicles with canvas and to protect the goods being transported.

The system is designed in such a way that two motors prepared and machined for this purpose exert enough power to move a roller inside which the canvas is wound and permit the canvas to slide along mechanized guides until it hermetically covers the enclosure in which the goods are transported and, in the same automatic way, to be able to draw back the canvas at the time of unloading by simply pushing a switch connected to the motors.

BACKGROUND OF THE INVENTION

According to official regulations, it is obligatory for vehicles that transport goods that they be covered and that the wagon of the vehicle is well covered with canvas to avoid spilling of wastes that could cause problems of dirtiness or toxicity that contaminate the environment and even cause traffic accidents, both on the highways as well as the railroad, etc.

On the other hand, many goods may be affected by the weather conditions during their transport (sun, water, hail, snow, etc.) and thus become damaged if they are not duly protected (grain, fodder, coal, etc.).

At the present,. the canvas used to protect goods is extended and drawn back manually, which forces the drivers and assistants of the vehicles to climb up to the wagon where the goods are transported, with the corresponding risk of accidents due to height and effort to be made apart from entering into direct contact with the material to be transported, which leaves stains and gives off bad smells that become impregnated in their clothes. In the case of trucks, this inconvenience is transmitted to the cab which at times makes it necessary to wear special clothes for certain goods, such as material for asphalting, remains of abattoirs, etc.

This process results in important losses in time. To cover a vehicle with canvas may take between fifteen and twenty-five minutes and to uncover it between ten and twenty minutes, apart from expenses in cleaning sweat shirts, cabs, boots, etc.

At present some vehicles have placed a roller for better arrangement of the canvas or cable to make its movement easier, but in all cases the system is slow, bodily effort is required and still requires that somebody has to climb up to the higher part of the wagon or tank of the vehicle to carry out the canvas covering and uncovering operation.

Among these systems known in the state-of-the-art, firstly the French patent FR-751374 of 1993 can be mentioned. This is a manual system applied to the canvas covering of epoch cars and its purpose is not applicable to the covering of a truck wagon.

Likewise, patent WO 92/05047 of 1992 tries to solve the problem presented of covering the load of a truck by means of a plastic that adapts to the shape of the load. This solution presents problems of a practical nature, such as calculating the height of the mounts to be covered, as in the event that the plastic rubs against any of them to check its advance.

Likewise, with this system perfect watertightness is not achieved and water may enter the load although the canvas does not have a water escape outlet.

The invention in question is able to solve all the present problems at the same time as it facilitates that the canvas covering and uncovering operations are carried out automatically. These operations are performed in a time of three to six minutes and the vehicle is left hermetically closed, thus avoiding spills, the time is shortened and, therefore, costs are lowered, as well as eliminating the necessity to climb up to the wagon of the vehicle. At present this necessity causes a high risk of accidents and dirtiness and discomfort in the working conditions of the operators. All these problems have been attested to transport unions and associations, where after a certain period of time the difficulty and risks arising from having to manually cover and uncover canvas are enormously increased.

SUMMARY OF THE INVENTION

The present invention includes a canvas covering and uncovering system for the loading area for freight vehicles, having two motors prepared and machined for this purpose to exert enough power to move a roller inside which the canvas is wound and permits the canvas to slide along some mechanized guides until it hermetically covers the enclosure in which the goods are transported and, in the same automatic way, to be able to draw back the canvas at the time of unloading.

This process is operated simply by pushing a switch connected to the motors.

The motors will be powered by means of the vehicle battery. These motors transmit mechanical torque to turn the pinions, through which the roller and chain that circulate inside the guide are synchronized. These motors, on having a double turning direction, permit the canvas covering and uncovering process to be perfectly performed.

The guide is prepared so that a synchronized chain extending between two pinions and joined at its ends to a slide can circulate inside it.

It is the slide that pulls the canvas along the guide, with the canvas joined to said slide by a wire and pulling plate. All of this permits hermetic closing of the loading enclosure of the vehicle.

To complement the description which follows and in order to help with a better understanding of its characteristics, a set of drawings are included, the figures of which will permit an easier understanding of the innovations, improvements and advantages of the invention system.

DESCRIPTION OF A PREFERRED PERFORMANCE

Figure 1:
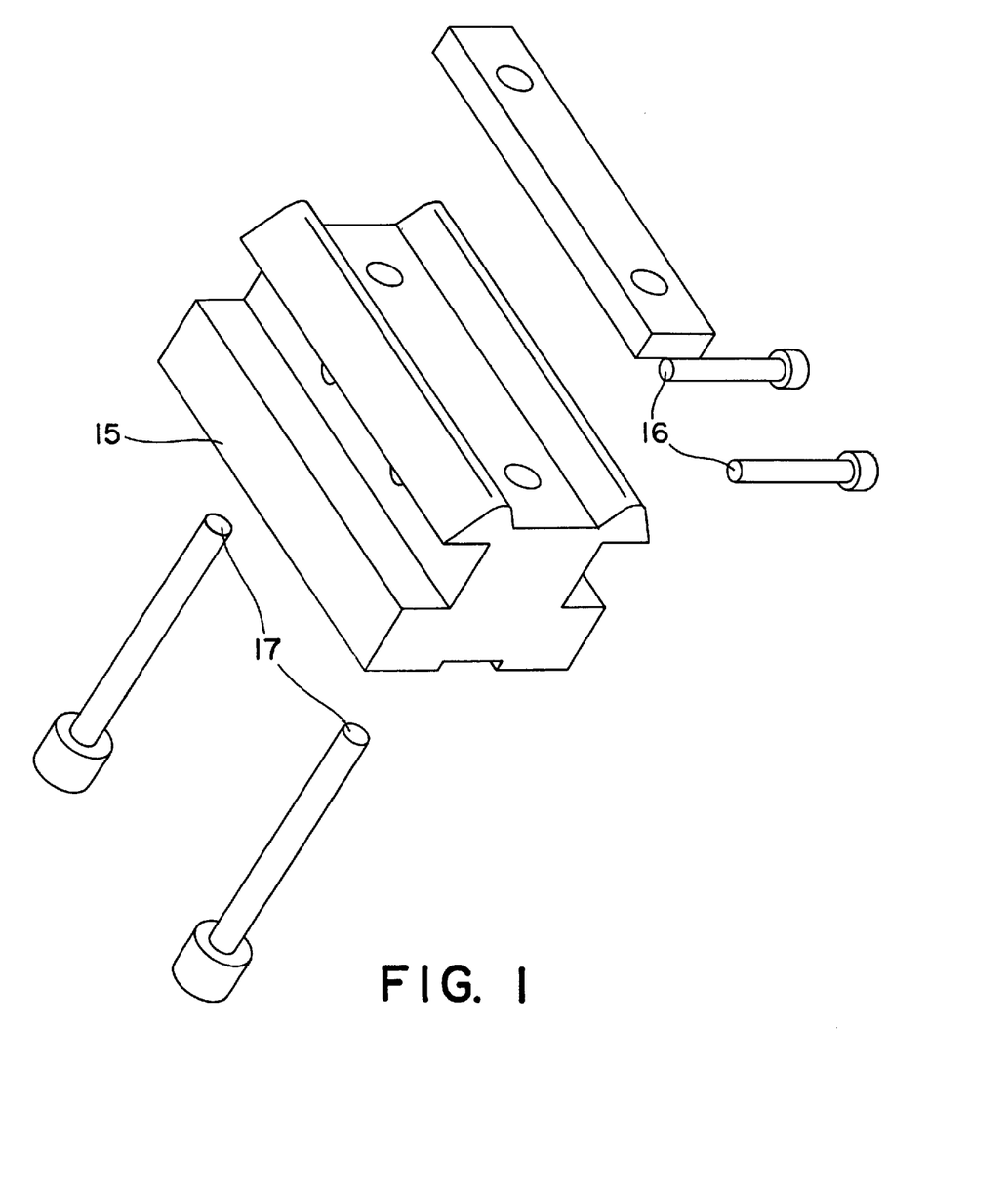
FIG. 1 shows a divided isometric perspective view of the slide.
Figure 2:
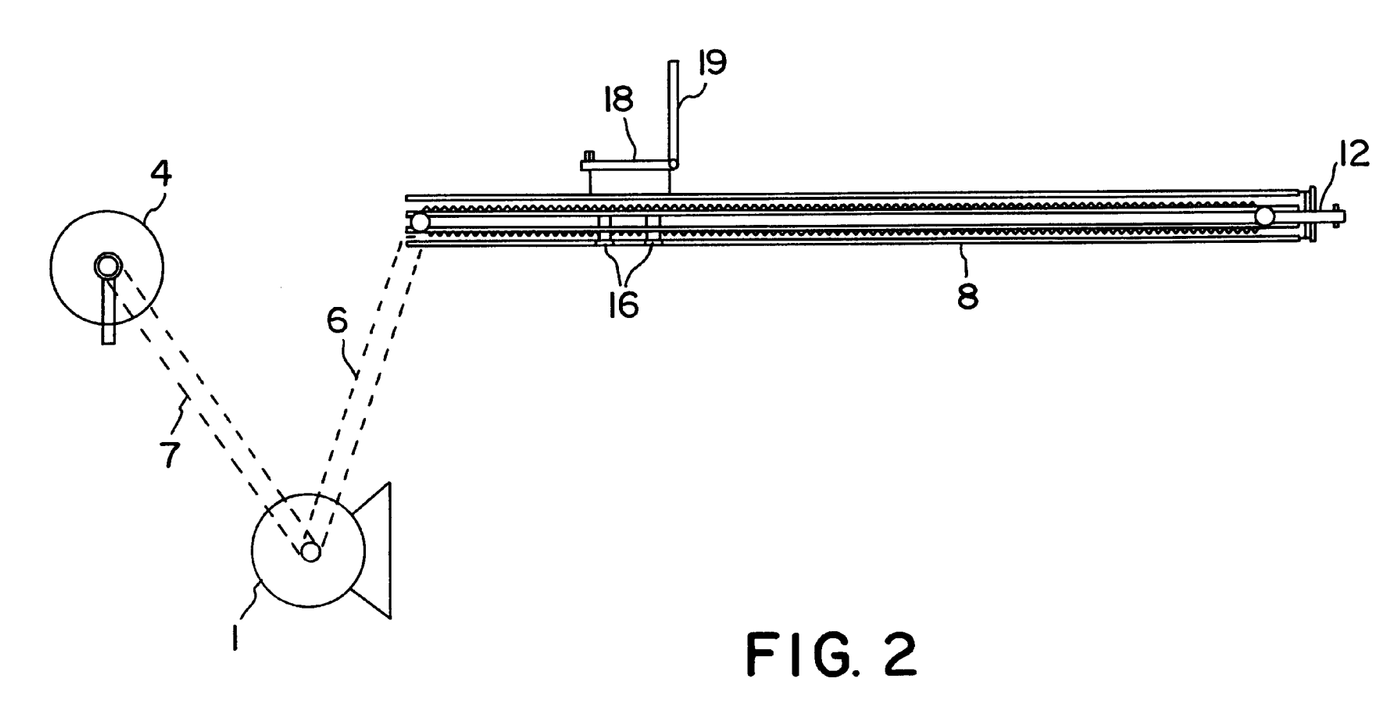
FIG. 2 shows a right-hand side view of the system components.
Figure 3:
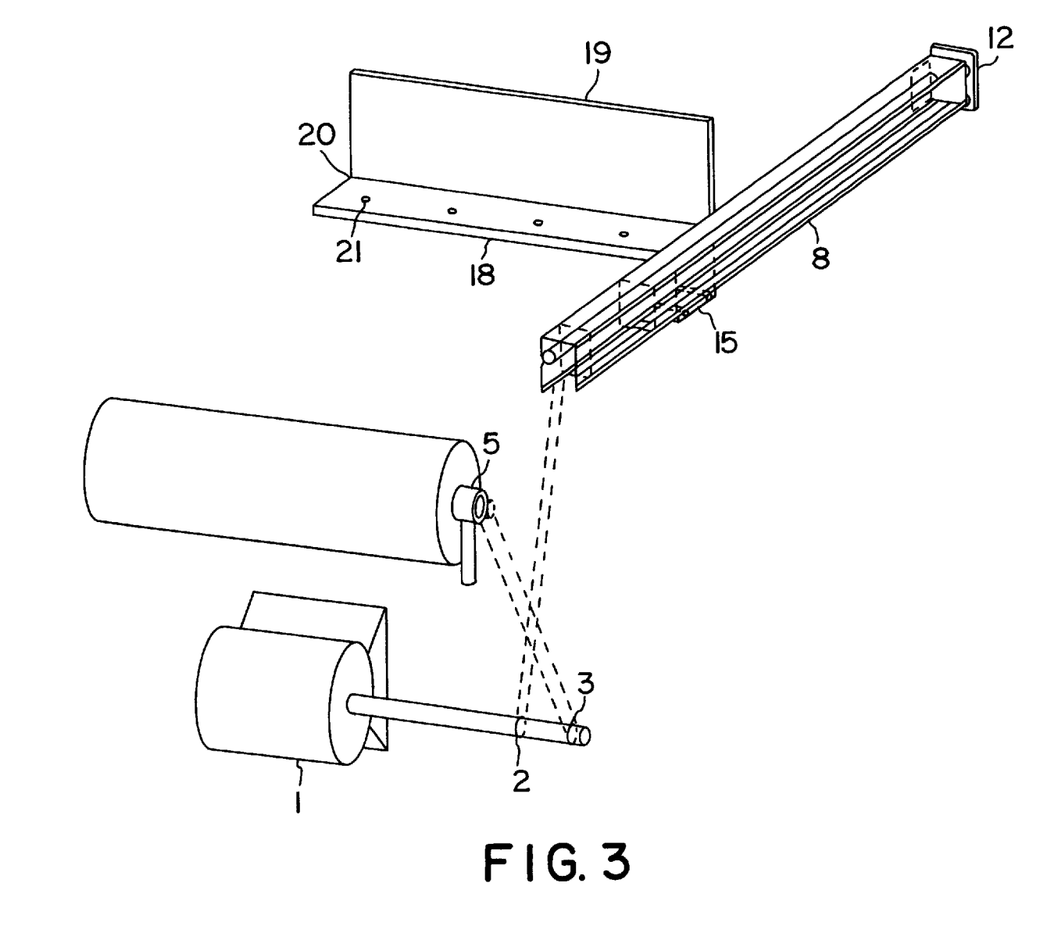
FIG. 3 shows an isometric perspective view of the right half of the system.
Figure 4:
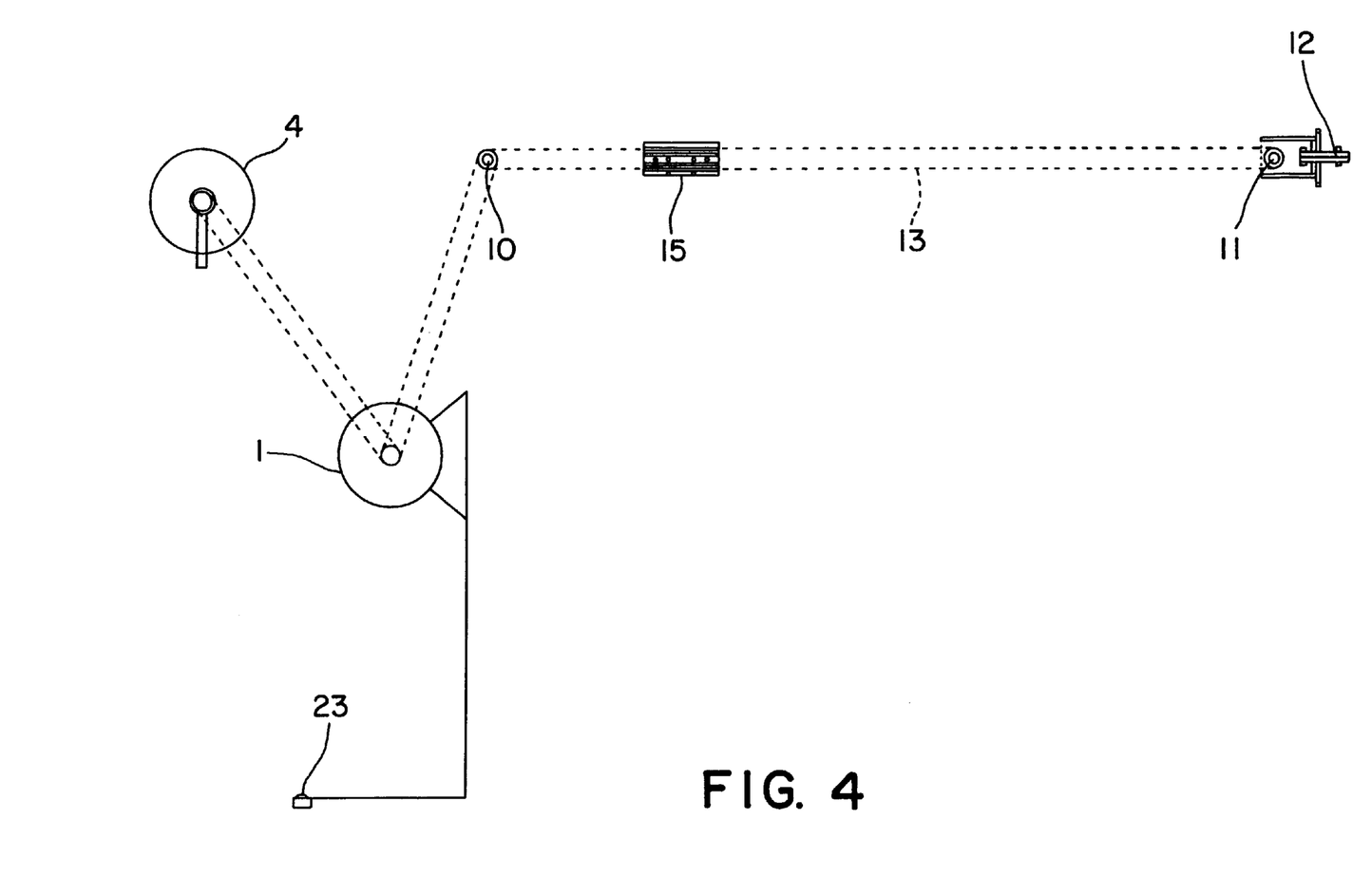
FIG. 4 shows a right-hand side view of the system, hiding the guide, cross section and pulling plate in order to appreciate its interior operation.
Figure 5:
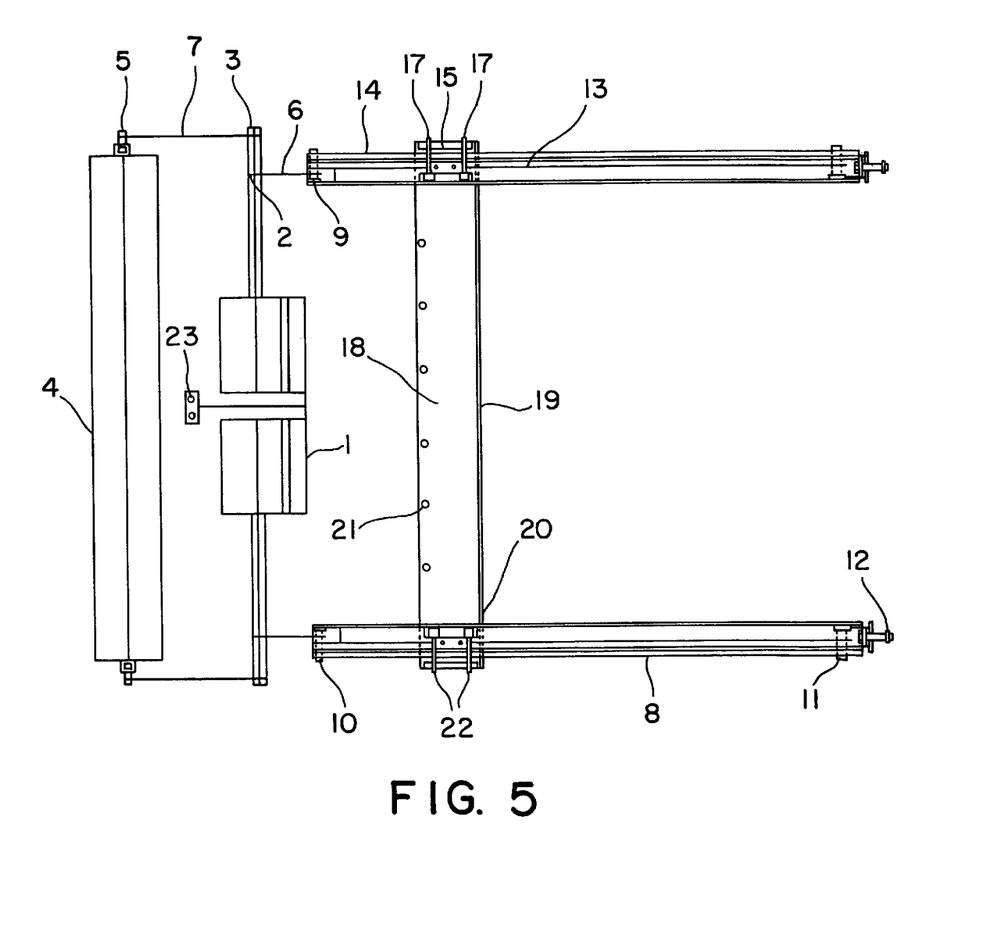
FIG. 5 shows an upper floor view of the system components to be coupled to the loading enclosure of the vehicle, where their synchronization is able to be seen.
Figure 6:
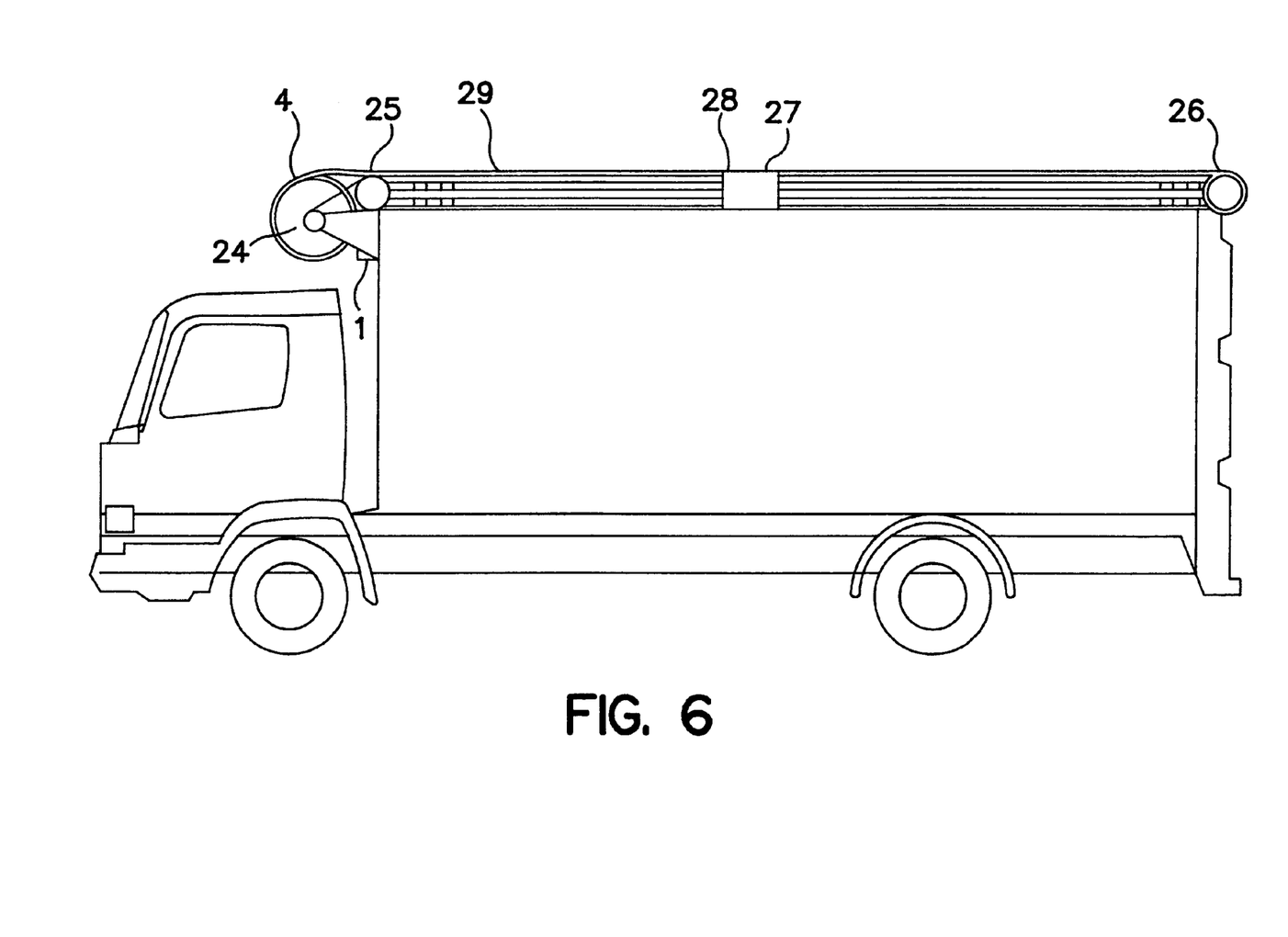
FIG. 6 shows a right-hand side view of the system incorporated in a vehicle.
Figure 7:
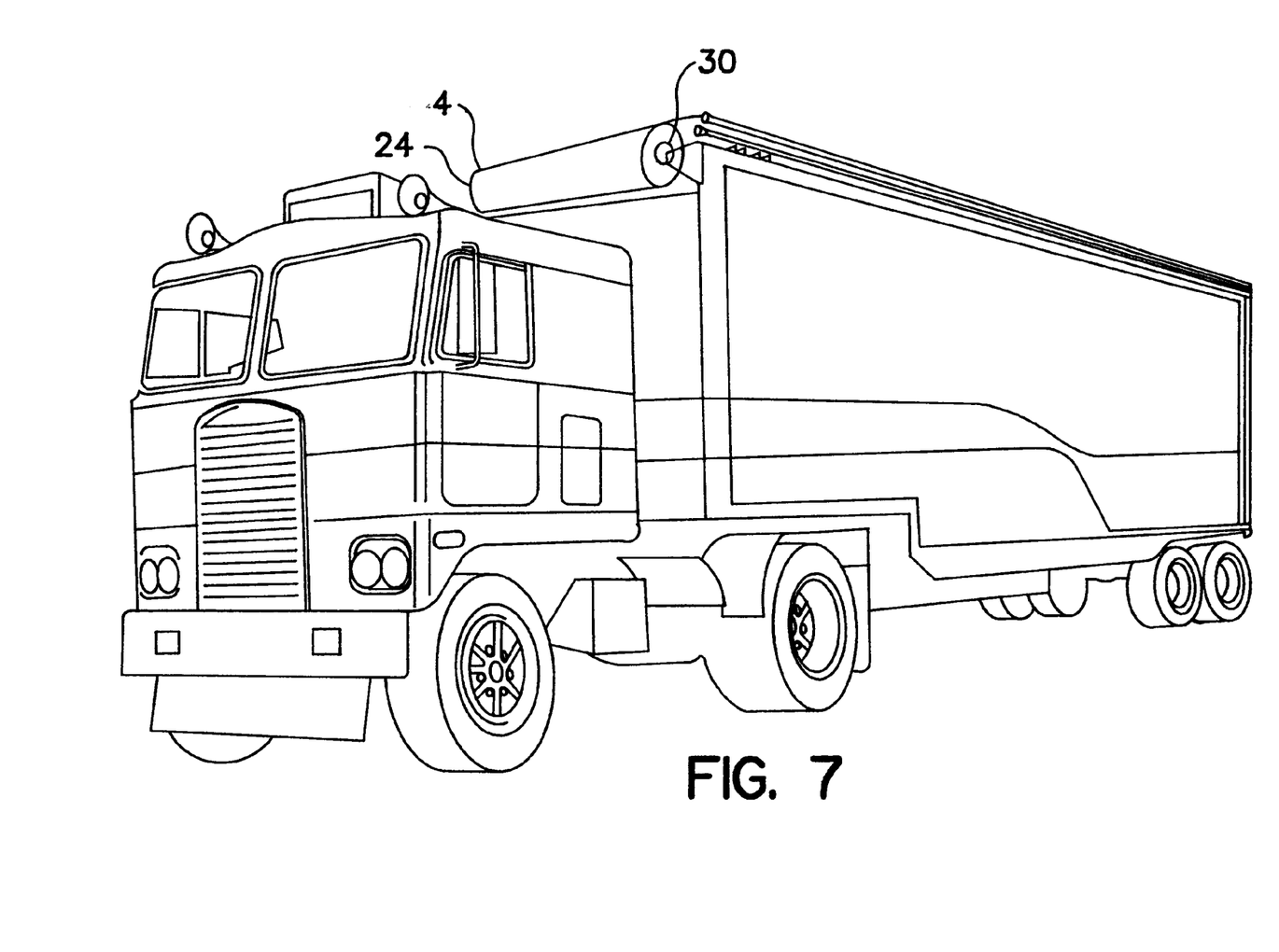
FIG. 7 shows an isometric perspective view of the system incorporated in a truck.
Figure 8:
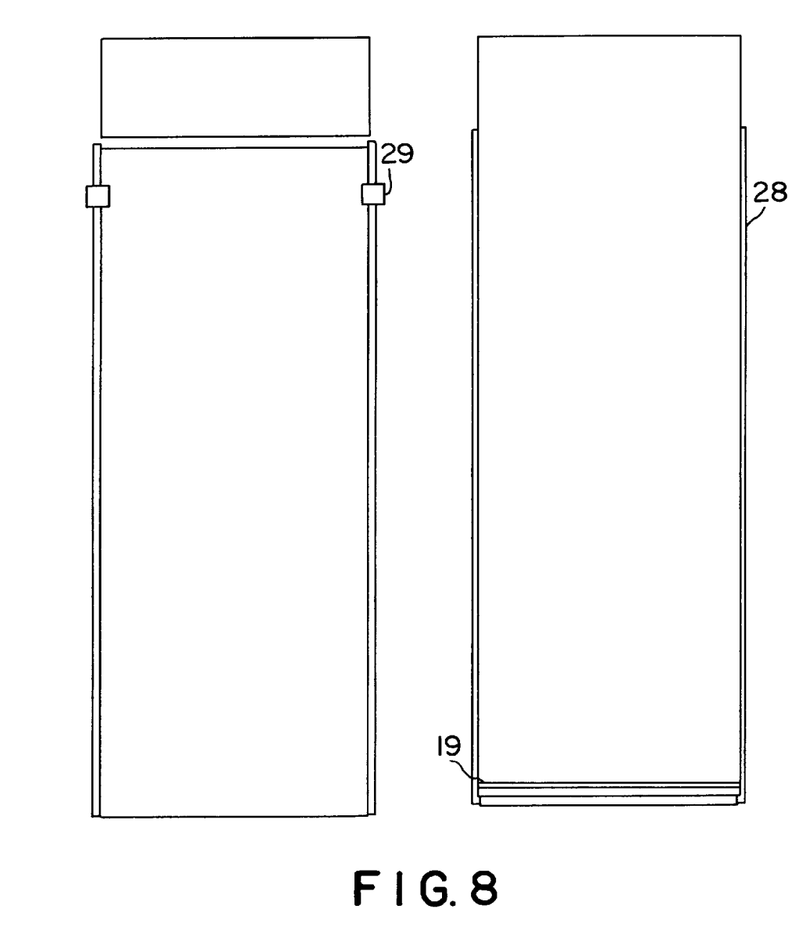
FIG. 8 shows an upper floor view of the system in its open and shut forms.
Figure 9:
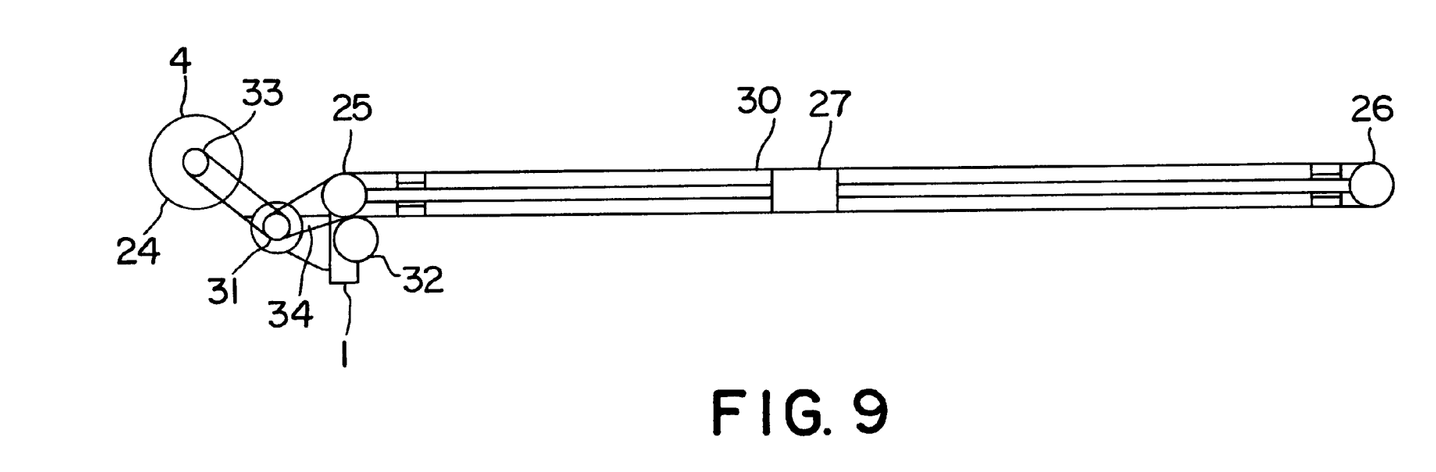
FIG. 9 shows a right-hand side view of the arrangement of all the components to be coupled to the loading enclosure of the vehicle, where their synchronization is able to be seen.

In view of the figures indicated above, it can be seen how this canvas covering and uncovering system for freight vehicles is basically composed of a canvas (28) which can be wound on a roller (4), located in the front part of the wagon of the truck, in order to extend and fold it up along the roof of the loading wagon of the truck, thus covering the load.

This system is provided with some slides (15) that move inside guides (8). Between both slides there is a rod attached with screws and holes (17) and (22) which acts as a mechanical claw on the canvas (28) and consists of a pulling plate (19) joined by a hinge (20) to a cross section (18) provided with anchor holes (21).

The system is operated in a synchronized way by two single-phase motors (1) with enough power to overcome the resistance offered by the load when passing by the pulling plate (19). Thus, the canvas along its path with the mentioned pulling plate (19) manages to extend the load, pulling and leveling the mounts that the loading materials may form and achieving a closure of certain watertightness.

On the other hand, the canvas is reinforced on the side, throughout its length, by steel wires (14), joined to the slides (15), whilst the motor (1) transmission is made by chains (13) geared in pinions (9,10,11) plus a tensor axis (12) and the system is operated by a control (23) connected to the motors.

This system can incorporate, as indicated above, two electric motors (1) the power of which will be given by the length of the vehicle and the pulling requirements. Likewise, the same function can also be achieved with one motor only of more power. In the same way, the double direction motor may be replaced by two motors, each one carrying out one function, canvas covering and uncovering, respectively. Apart from this, the system has a clutch so that it can be disconnected in case of failure, which is supplied by the battery of the vehicle.

The system can also be operated by the motor of the vehicle itself with the help of a mechanical drive to the gearbox of the vehicle. This is a possibility that may be included.

Likewise, the roller (4) where the canvas (28) is wound is synchronized with the motor (1) by means of a pair of pinions (3, 5) operated by a drive chain (7) and one of the slides by a pinion (2) and drive chain (6). In this way, the amount of canvas (28) necessary is supplied at all times, maintaining a constant tightness of the canvas and preventing it from falling.

Furthermore, the canvas as regards the goods to be transported will be reinforced both mechanically and thermally. In this respect, the canvas may be meshed on the inside with metallic wire.

On the other hand, the slides (15) have clamps held in place by anchor bolts (16,17) so that the canvas supported by the wires (14) inserted in their sides is moved in both directions along the inside, guaranteeing a certain watertight closure along the sides. In this way, it is avoided that the pulling plate (19), during its function of pulling and leveling the goods during the canvas covering operation, can insert particles into the guides (8) and cause a difficult operation or even bring the system to a standstill.

The canvas (28) can also be supported by a framework in the shape of folding top or even articulated arms that permit it to become adapted to certain necessities of the vehicle in order to carry out the canvas covering and uncovering in a more specialized way.

Likewise, the canvas instead of being placed transversally as regards the wagon of the vehicle can be placed lengthwise, running along the width of the loading enclosure. In order to achieve this, it will be necessary only to modify the positioning of the system.

Another possible alternative in the mentioned system is that the motor (1) supply system turns out to be a source of external supply, for example, in freight train wagons where the supply power of the motor, instead of being provided by the battery can come directly through a transformer of the central power point.

Finally, the system has a support (34) of the motor (1) attached to the wagon of the vehicle and a cleaning, greasing and pulling bearing (27) that slides inside a cylindrical guide (29) joined to a steel wire (30) that runs along some pulleys (25,26,31,32) and to which the anchor cross section (18) of the edge of the canvas (28), wound on the synchronized roller (4) to the motor (1) by means of a pulley (24) and a wire (33), is likewise attached.

What is claimed is:

1. System of canvas covering and uncovering for freight vehicles, said system comprising:

a canvas rolled on a roller located at a front part of a truck wagon, which is able to be extended and folded back along a roof of the truck wagon, slides being displaced inside guides with a rod attached between the slides acting as a mechanical claw on the canvas and including a pulling plate joined by a hinge to a cross section provided with anchor holes, two single-phase motors operated with enough power to overcome a resistance presented by a load when moved past the pulling plate, the canvas being reinforced on both sides, throughout its length, by steel wires, joined to the slides, whilst a transmission of the motors being made by drive chains geared in pinions plus a tensor axis and operated by a control connected to the motors.

2. System of canvas covering and uncovering for freight vehicles, according to claim 1, wherein a power requirement of the motors is determined by a length of the truck wagon and pulling requirements of the canvas.

3. System of canvas covering and uncovering for freight vehicles, according to claim 1, wherein the roller is wound synchronized with the motor by a couple of pinions operated by a drive chain and one of the slides by a pinion and the drive chains.

4. System of canvas covering and uncovering for freight vehicles, according to claim 1, wherein the canvas is reinforced, both mechanically and thermally.

5. System of canvas covering and uncovering for freight vehicles, according to claim 1, wherein the slides have clamps held in place by anchor bolts so that the canvas supported by the wires is moved in both directions for a watertight closure.

6. System of canvas covering and uncovering for freight vehicles, according to claim 1, wherein the canvas is supported by a framework to permit the canvas.

7. System of canvas covering and uncovering for freight vehicles, according to claim 1, wherein the canvas is placed lengthwise, running along a width of the truck wagon.

* * * * *